(12) United States Patent
Rioul et al.

(10) Patent No.: US 11,588,616 B2
(45) Date of Patent: Feb. 21, 2023

(54) SECRET KEY ESTIMATION METHODS AND DEVICES

(71) Applicant: INSTITUT MINES-TELECOM, Paris (FR)

(72) Inventors: Olivier Rioul, Orangis (FR); Sylvain Guilley, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 363 days.

(21) Appl. No.: 16/089,304

(22) PCT Filed: Mar. 28, 2017

(86) PCT No.: PCT/EP2017/057295
§ 371 (c)(1),
(2) Date: Sep. 27, 2018

(87) PCT Pub. No.: WO2017/167739
PCT Pub. Date: Oct. 5, 2017

(65) Prior Publication Data
US 2020/0313845 A1 Oct. 1, 2020

(30) Foreign Application Priority Data
Apr. 1, 2016 (EP) ..................................... 16305386

(51) Int. Cl.
*H04L 9/00* (2022.01)
*H04L 9/06* (2006.01)

(52) U.S. Cl.
CPC ............ *H04L 9/002* (2013.01); *H04L 9/0631* (2013.01); *H04L 2209/08* (2013.01); *H04L 2209/12* (2013.01)

(58) Field of Classification Search
CPC ... H04L 9/002; H04L 9/0631; H04L 2209/08; H04L 2209/12; H04L 2209/26; H04L 9/0618; G09C 1/00
See application file for complete search history.

(56) References Cited

U.S. PATENT DOCUMENTS

| 7,237,115 B1 * | 6/2007 | Thomas | H04L 9/32 |
| | | | 713/176 |
| 7,925,253 B2 * | 4/2011 | Breit | H04B 17/15 |
| | | | 455/425 |

(Continued)

OTHER PUBLICATIONS

Suvadeep et al. Pushing the Limit of Non-Profiling DPA Using Multivariate Leakage Model, Dept. of Computer Science & Engg. Indian Institute of Technology, Kharagpur, India, Dec. 15, 2013, citeseerx.ist.psu.edu/viewdoc/download?doi=10.1.1.437.8184&rep=rep1&type=pdf. (Year: 2013).*

(Continued)

*Primary Examiner* — Oleg Korsak
(74) *Attorney, Agent, or Firm* — BakerHostetler

(57) ABSTRACT

A secret key estimation device is provided for determining an estimate of at least one secret key used during a number of executions of a cryptographic function used by at least one cryptographic algorithm. The number of executions of the cryptographic function is at least equal to two. The secret key estimation device comprises an analysis unit for determining a plurality of sets of leakage traces from a side-channel information acquired during the number of executions of the cryptographic function. Each set of leakage traces corresponds to an execution of the cryptographic function and comprising at least one leakage trace. The secret key estimation device further comprises a processing unit configured to determine a statistical distribution of the acquired plurality of sets of leakage traces. The statistical distribution is dependent on a leakage function, the leakage (Continued)

function being represented in a basis of functions by a set of real values. The secret key estimation device is configured to determine the secret key from the statistical distribution of the plurality of sets of leakage traces using an estimation algorithm according to the maximization of a performance metric.

10 Claims, 5 Drawing Sheets

(56) References Cited

U.S. PATENT DOCUMENTS

| | | | | |
|---|---|---|---|---|
| 8,200,797 | B2* | 6/2012 | Meng | H04L 41/145 709/223 |
| 8,369,517 | B2* | 2/2013 | Venelli | H04L 9/3013 380/30 |
| 8,625,780 | B2* | 1/2014 | Peter | H04L 9/06 380/28 |
| 9,390,065 | B2* | 7/2016 | Kosko | G06K 9/6226 |
| 9,496,935 | B1* | 11/2016 | Kwon | H04L 27/0008 |
| 9,584,320 | B1* | 2/2017 | Parkinson | H04L 9/0841 |
| 9,640,090 | B2* | 5/2017 | Takashima | H04L 9/0861 |
| 9,716,584 | B2* | 7/2017 | Dubeuf | H04L 9/3066 |
| 9,843,494 | B2* | 12/2017 | Casebolt | H04W 72/085 |
| 10,567,155 | B2* | 2/2020 | Medwed | G06F 7/582 |
| 2003/0044003 | A1* | 3/2003 | Chari | G06F 21/556 380/28 |
| 2015/0074159 | A1* | 3/2015 | Poschmann | G09C 1/00 708/270 |
| 2015/0110266 | A1* | 4/2015 | Debraize | H04L 9/3242 380/30 |
| 2015/0381351 | A1* | 12/2015 | Kuenemund | H04L 9/003 713/189 |
| 2017/0235663 | A1* | 8/2017 | Kattepur | G06F 11/3433 717/131 |

OTHER PUBLICATIONS

Heuser et al. (Good Is Not Good Enough Deriving Optimal Distinguishers, from Communication Theory, CHES 2014, LNCS 8731, pp. 55-74, 2014) (Year: 2014).*
Chari, et al., "Towards Sound Approaches to Counteract Power-Analysis Attacks", Advances in Cryptology—Crypto, vol. 1666 of the Series Lecture Notes in Computer Science, pp. 398-412, 1999.
Chari, et al., "Template Attacks", Cryptographic Hardware and Embedded Systems (CHES), vol. 2523 of the Series Lecture Notes in Computer Science, pp. 13-28, 2002.
Schindler, et al., "A Stochastic Model for Differential Side Channel Cryptanalysis", Cryptographic Hardware and Embedded Systems (CHES), vol. 3659 of the Series Lecture Notes in Computer Science, pp. 30-46, 2005.
Heuser, et al., "Good Is Not Good Enough—Deriving Optimal Distinguishers from Communication Theory", Cryptographic Hardware and Embedded Systems (CHES), vol. 8731 of the Series Lecture Notes in Computer Science, pp. 55-74, 2014.
Standaert, et al., "A Unified Framework for the Analysis of Side-Channel Key Recovery Attacks", Eurocrypt, vol. 5479 of the Series Lecture Notes in Computer Science, pp. 443-461, 2009.
Kocher, et al., "Differential Power Analysis", Advances in Cryptology—Crypto, vol. 1666 of the Series Lecture Notes in Computer Science, pp. 388-397, 1999.
Brier, et al., "Correlation Power Analysis with a Leakage Model", Cryptographic Hardware and Embedded Systems (CHES), vol. 3156 of the Series Lecture Notes in Computer Science, pp. 16-29, 2004.
Gierlichs, et al., "Mutual Information Analysis", Cryptographic Hardware and Embedded Systems (CHES), vol. 5154 of the Series Lecture Notes in Computer Science, pp. 426-442, 2008.
Doget, et al., "Univariate Side-Channel Attacks and Leakage Modeling", Journal of Cryptographic Engineering, 1(2):123-144, 2011.
Clavier, et al., "Improved Collision-Correlation Power Analysis on First Order Protected AES", Cryptographic Hardware and Embedded Systems (CHES), pp. 49-62, 2011.
Bogdanov, et al., "Improved Side-Channel Collision Attacks on AES", Selected Areas in Cryptography, vol. 4876 of Lecture Notes in Computer Science, pp. 84-95, 2007.
Moradi, et al., "Correlation-Enhanced Power Analysis Collision Attack", Cryptographic Hardware and Embedded Systems (CHES), vol. 6225 of the Series Lecture Notes in Computer Science, pp. 125-139, 2010.
Blomer, et al., "Provably Secure Masking of AES", Selected Areas in Cryptography, pp. 69-83, 2004.
Ye, "Side Channel Leakage Analysis—Detection, Exploitation and Quantification", Dec. 1, 2014, XP055303015.
Guilley, et al., "A Key to Success", Lecture Notes in Computer Science, pp. 270-290, Nov. 28, 2015.
Bhasin, et al., "Side-Channel Leakage and Trace Compression Using Normalized Inter-Class Variance", International Association for Cryptologic Research, vol. 20150701:174108, pp. 1-26, Jul. 1, 2015.
Chen, et al., "Statistical Modeling and Analysis of Static Leakage and Dynamic Switching Power", Integrated Circuit and System Design, Power and Timing Modeling, Optimization and Simulation, pp. 178-187, Sep. 10, 2008.
English translation of the Notice of Grounds for Rejection issued in Korean Patent Application No. 10-2018-7031134 dated Feb. 17, 2022.
Bruneau, et al., "Masks will fall off", International Conference on the Theory and Application of Cryptology and Information Security, pp. 344-365, Dec. 2014.

* cited by examiner

SECRET KEY ESTIMATION METHODS AND DEVICES

CROSS-REFERENCE TO RELATED APPLICATIONS

This application is a National Stage of International patent application PCT/EP2017/057295, filed on Mar. 28, 2017, which claims priority to foreign European patent application No. EP 16305386.1, filed on Apr. 1, 2016, the disclosures of which are incorporated by reference in their entirety.

TECHNICAL FIELD

The invention generally relates to cryptographic systems and in particular to methods and devices for estimating secret keys used in cryptographic algorithms.

BACKGROUND

Emerging computer and communications technologies have radically altered the ways in which information is communicated and exchanged. Along with the speed, efficiency, and cost-saving benefits of the "digital revolution" came new challenges to the security and privacy of communications and information traversing the global communication infrastructure.

In response to these challenges, several cryptographic security techniques have been designed. The use of cryptography allows protecting stored, processed and communicated information against interceptors or eavesdroppers. Various keyed cryptographic algorithms have been developed. They essentially use secret information to protect data during its storage, processing or transit and to provide confidentiality, integrity, authenticity, non-repudiation-services which are crucial for almost any security-related application.

In addition, key-based cryptographic algorithms can be combined with randomization techniques such as secret splitting or masking schemes. Randomization techniques may be advantageously used to add a protection layer to the cryptographic algorithms. They stand on random unknown numbers that prevent unintended receivers or attackers from predicting secret cryptographic keys. Exemplary masking schemes are disclosed for example in:

"S. Chari, C. S. Jutla, J. R. Rao, and P. Rohatgi. Towards Sound Approaches to Counteract Power-Analysis Attacks. Advances in Cryptology-CRYPTO. Volume 1666 of the Series Lecture Notes in Computer Science. Pages 398-412. 1999".

Cryptanalysis techniques can be used to evaluate the protection and security levels of any information system implementing cryptographic algorithms. Numerous cryptanalysis methods have been proposed. Traditional mathematical methods target essentially weaknesses of the cryptographic algorithms based on their inputs and outputs. Recently, there has been a rising interest in the analysis of side-channel attacks. Side-channel analysis designates a cryptanalysis method that does not target weaknesses in the cryptographic algorithms themselves, but instead exploits weaknesses in their implementations.

Side-channel attacks rely on the fact that any real-world implementation of a cryptographic algorithm is not ideal and leaks some physically observable parameters that are dependent on the secret key or on the internal state of the attacked system. Such parameters include time, power consumption, electro-magnetic radiation and algorithm behavior under actively induced execution faults. Having immediate access to physically leaking cryptographic implementations, an attacker can use the side-channel information to extract the highest possible amount of information related to the cryptographic secret key and to possibly recover the cryptographic secret key. Side-channel attacks remain a major concern endangering personal privacy and challenging the protection and security of cryptographic systems.

Side-channel attacks achieve key-related information extraction by exploring the dependency between side-channel observables (also referred to as "measurements", or "traces", or "leakage traces") and the internal state of the attacked system. Such dependency is described with a particular leakage model. A leakage model, such as the Hamming weight/distance model, is a probabilistic model used to characterize the statistical distribution of the leakage traces given any secret cryptographic key hypothesis. Leakage traces modeled by a leakage model can be considered as originating from a simulation of such leakage model. Accordingly, side-channel attacks can be grouped into two categories, called "profiled attacks" and "unprofiled attacks", based on the knowledge of the leakage behavior of the attacked cryptographic system.

The first "profiled attacks" category includes template and stochastic attacks disclosed for example respectively in:

"S. Chari, J. R. Rao, and P. Rohastgi. Template Attacks. Cryptographic Hardware and Embedded Systems (CHES). Volume 2523 of the Series Lecture Notes in Computer Science. Pages 13-28. 2002.";

"W. Schindler, K. Lemke, and C. Paar. A Stochastic Model for Differential Side Channel Cryptanalysis. Cryptographic Hardware and Embedded Systems (CHES). Volume 3659 of the Series Lecture Notes in Computer Science. Pages 30-46. 2005".

Profiled attacks require a profiling phase and an online key recovery phase. During the profiling phase, an attacker, equipped with a device that is identical to the attacked device, attempts to characterize the leakage model of the attacked device. Thereafter, during the second phase, the attacker tries to recover the secret key using the determined leakage model and the leakage traces acquired during the run time of the attacked system. Key extraction is performed using an estimation algorithm known as a "distinguisher" and according to the maximization of a performance metric. Optimal distinguishers for profiled attacks are based on the "maximization of the probability of success recovery of secret cryptographic keys". Such maximization problem remains, in the presence of uniformly distributed cryptographic key values, tantamount to a Maximum Likelihood (ML) optimization problem. As disclosed in "A. Heuser, O. Rioul, and S. Guilley. Good Is Not Good Enough—deriving Optimal Distinguishers from Communication Theory. Cryptographic Hardware and Embedded Systems (CHES). Volume 8731 of the Series Lecture Notes in Computer Science. Pages 55-74. 2014", ML distinguishers provide optimal performance by maximizing the success rate, i.e. the rate of successful estimation of secret cryptographic keys.

Further, distinguisher may be based on other performance criteria such as the "guessing entropy" and the "$d^{th}$-order success rate" disclosed both in "F-X. Standaert, T. Malkin, and M. Yung, A Unified Framework for the Analysis of Side-Channel Key Recovery Attacks, EUROCRYPT, Volume 5479 of the Series Lecture Notes in Computer Science, Pages 443-461, 2009". The guessing entropy provides the rank of the correct key. The "$d^{th}$-order success rate" relates to the probability that the correct key is sorted among the d best secret keys returned by the distinguisher.

Profiled attacks exploit the leakage model knowledge or characterization to recover secret cryptographic keys. Stochastic profiled attacks exploit in particular a parametric characterization of the leakage model. However, for some devices and applications, the leakage profiling may not be possible either because the attacker does not hold an open copy of the attacked device (first case) or because the leakage nature is unpredictable (second case).

The first case may for example happen in applications such as banking and electronic communications because the secret key cannot be set to a chosen value. The second case mainly occurs in the presence of leakage-specific devices based for example on Physically Unclonable Functions (PUF). Each PUF-based device has a specific leakage behavior due to the variability in the fabrication process or when countermeasures are applied to reduce the differences in the leakage due to the processed data. The specificity of the leakage behavior to each device prevents the application of a learned leakage model from one design to another. In practice, exemplary leakage-specific devices comprise hardware circuits implemented in complementary metal-oxide-semiconductors (CMOS) or deep submicron (DSM) technologies.

In such situations where the leakage behavior cannot be characterized nor captured by the conventional models, only unprofiled attacking strategies can be used. Three main attacking approaches of the type "unprofiled" can be considered:

assuming a hypothetical model supposed to be close enough to reality, estimating the leakage model up to a parameterization, or ignoring the leakage model.

Strategies which are based on an assumption of a leakage behavior of the attacked systems or devices comprise:

Differential power analysis (DPA) disclosed for example in "P. Kocher, J. Jaffe, and B. Jun. Differential Power Analysis. Advances in Cryptology-CRYPTO. Volume 1666 of the Series Lecture Notes in Computer Science. Pages 388-397. 1999";

Correlation power analysis (CPA) disclosed for example in "E. Brier, C. Clavier, and F. Olivier. Correlation Power Analysis with a Leakage Model. Cryptographic Hardware and Embedded Systems (CHES). Volume 3156 of the Series Lecture Notes in Computer Science. Pages 16-29. 2004";

Mutual Information Analysis (MIA) disclosed for example in "B. Gierlichs, L. Batina, P. Tuyls, and B. Preneel. Mutual Information Analysis. Cryptographic Hardware and Embedded Systems (CHES). Volume 5154 of the Series Lecture Notes in Computer Science. Pages 426-442. 2008".

DPA and CPA are the most wide-spread practical attacks which target numerous embedded systems such as smart-card microcontrollers and dedicated application specific integrated circuits (ASICs).

Side-channel attacks based on a parametric estimation of the leakage behavior of the attacked system during its run time comprise linear regression analysis (LRA) disclosed for example in "J. Doget, E. Prouff, M. Rivain, and F-X. Standaert, Univariate Side-Channel Attacks and Leakage Modeling, Journal of Cryptographic Engineering, 1(2):123-144. 2011". LRA aims at inferring the model in a profiling phase. Some minimum assumptions about the algebraic properties of the leakage model are required using LRA.

Both leakage-model oriented attacks based on a leakage model assumption or on a parametric estimation are sensitive to leakage modeling errors. The error from leakage modeling assumption or the lack of a detailed a priori knowledge about the cryptographic implementation can aggravate or even prevent successful recovery of cryptographic keys. However, successful key extraction may sometimes be necessary for security evaluation. Indeed, when the key is extracted, there is no ambiguity that the experimental setup for collecting the side-channel traces is correct and that the device is leaking. The success of a real key extraction is thus more trustworthy than a mere security metric. Besides, in some cases, during the product development, it can be wise to test an attack while not all countermeasures are activated, and then check whether or not the attack remains possible after activation of all countermeasures.

Furthermore, such strategies present limited efficiency as they require many measurements (more than strictly needed) for characterizing or comparing the statistical distribution of the hypothetical leakage model.

To circumvent the modeling issue, alternative side-channel "collision attacks" have been developed. Instead of estimating or assuming a leakage model, collision attacks are not based on any particular leakage model and do not require any significant a priori knowledge of the cryptographic implementation, which is a major limitation in many side-channel attacks.

Collision attacks are also known as "pattern matching-oriented" side-channel attacks as they are essentially based on the leakage similarity of intermediate processed data. An internal collision occurs when a same internal state of a cryptographic implementation is obtained while computing different inputs. Collision attacks exploit the fact that when such collisions occur, intermediate values or values that depend on the same key or a same part of a key (also referred to hereinafter as 'sub-keys') can have similar leakage while not having identical leakage, due to noise effects. They can for example consume the same power and hence similar patterns can be observed in power/Electromagnetic measurements. An internal collision therefore informs an attacker that targeted key parts satisfy certain algebraic properties. Upon the detection of the occurred internal collisions, an attacker takes advantage of both side-channel leakage and algebraic properties of the processed data to reduce the search space of the valid key hypotheses and possibly recover the targeted key using a reduced number of leakage traces.

Collisions may happen between different executions of a cryptographic algorithm during different times. This is the case for example of software implementations of block ciphers which reuse a same instance of some cryptographic function, such as a substitution boxes (S-Box), several times. The AES algorithm is an example of such cryptographic algorithms, where the S-Box called Sub-Bytes is reused 16 times. Alternatively, leakages for different keys or different parts of keys would occur at the same time for example in hardware implementations. Different sensitive internal values would in this case leak simultaneously.

Side-channel collision attacks possess the unique combination of the three essential properties which are not simultaneously present in any other side-channel analysis technique. First, they are based on the algebraic properties of the attacked cryptographic algorithm. Second, they exploit the fact that the same leakage model applies equally (or can be adapted in a deterministic manner) to a set of calls to identical cryptographic functions. Third, they do not require any significant a priori knowledge of the cryptographic implementation. Exemplary collision attacks comprise:

collision attacks on AES disclosed for example in "C. Clavier, B. Feix, G. Gagnerot, M. Roussellet, and V. Verneuil, Improved Collision-Correlation Power Analysis on First Order Protected AES, Cryptographic Hardware and Embedded Systems (CHES), pages 49-62, 2011";

generalized collision attacks disclosed for example in "A. Bogdanov. Improved Side-Channel Collision Attacks on AES. Selected Areas in Cryptography. Volume 4876 of Lecture Notes in Computer Science. Pages 84-95. 2007"; and correlation enhanced collision attack disclosed in "A. Moradi, O. Mischke, and T. Eisenbarth. Correlation-Enhanced Power Analysis Collision Attack. Cryptographic Hardware and Embedded Systems (CHES). Volume 6225 of the Series Lecture Notes in Computer Science. Pages 125-139. 2010".

Such side-channel analysis strategies rely essentially on the assumption that side-channel traces are similar during the time span when an internal collision persists. Finding the exact time samples corresponding to the leakage similarity of internal collisions to detect collisions is a major concern in the context of side-channel attacks. A wrong detection of a collision may yield a misuse of the algebraic properties of the analyzed cryptographic algorithm. Accordingly, the correct targeted cryptographic key might be missed.

Existing side-channel collision attacks, including the above mentioned ones, present several limitations. Some drawbacks are essentially due to the complexity of the collisions detection and the use of only the leakage traces corresponding to internal collisions, thereby requiring an increased number of leakage traces and reducing the efficiency of the side-channel analysis.

Further, the above cited collision attacks present poor performance, for instance in implementations without key masking, due to the use of sub-optimal criteria to determine an estimation of the secret key from the leakage traces. In case of masked cryptographic implementations, the collision attacks on AES and generalized collision attacks still present limited performance, while the correlation enhanced attack can only be applied provided implementation conditions on the cryptographic function that may not be satisfied by any cryptographic system. For instance, if the masking is first-order perfect, as per the definition given in "Johannes Blömer, Jorge Guajardo, Volker Krummel: Provably Secure Masking of AES. Selected Areas in Cryptography 2004: 69-83", the correlation enhanced attack fails.

There is therefore a need for developing side-channel analysis methods that solve optimal performance criteria to determine estimations of secret cryptographic keys used in any masked or unmasked cryptographic implementation, thereby combining the benefits of side-channel collision analysis techniques with the efficiency of online profiled strategies.

SUMMARY

In order to address these and other problems, there is provided a secret cryptographic key estimation device to determine an estimate of at least one secret key used during a number of executions of a cryptographic function used by at least one cryptographic algorithm by performing an optimal joint analysis of leakage information acquired during the executions of the cryptographic function. According to one aspect of the invention, the estimate of the cryptographic key is determined from the statistical distribution of the total leakage traces acquired during the different executions of the cryptographic function. The statistical distribution depends on a leakage function. The leakage function is an element of a space vector over the real numbers. Each leakage function is represented by a set of unknown real values corresponding to its coordinates in a basis of functions spanning the space vector.

The estimation device may comprise an analysis unit configured to determine a plurality of sets of leakage traces from a side-channel information acquired during the number of executions of the cryptographic function. Each set of leakage traces comprises at least one leakage trace acquired during an execution of the cryptographic function.

The estimation device may further comprise a processing unit configured to determine a statistical distribution of the plurality of sets of leakage traces. The statistical distribution depends on a leakage function. The leakage function is represented in a canonical basis of functions by a set of real values. The estimation device is configured to determine the at least one estimate of secret cryptographic key from the determined statistical distribution of the plurality of sets of leakage traces using an estimation algorithm (also referred to hereinafter as "distinguisher") according to the maximization of a performance metric.

In certain embodiments, the analysis unit may be configured to determine the number of the sets of leakage traces from the number of executions of the cryptographic function.

In certain embodiments, the number of leakage traces in each set of leakage traces may be determined depending on the signal to noise ratio and/or on a target performance metric.

According to certain embodiments of the invention, the processing unit may be further configured to determine the statistical distribution of the plurality of sets of leakage traces depending on a noise of known covariance matrix.

In certain embodiments, the performance metric may be chosen in a group consisting of the probability of success secret cryptographic key calculation, the guessing entropy and the success rate of a given order.

In some embodiments, the estimation device may be further configured to determine estimates of the unknown real values representative of the leakage function.

In particular embodiments, the estimation device may use an iterative algorithm to determine the estimates of the unknown real values.

In one embodiment, the iterative algorithm may be an expectation maximization algorithm.

The estimation device may further be configured to deliver a performance metric from the determined estimate of at least one secret cryptographic key to evaluate the vulnerability of the analyzed cryptographic algorithm against one or more side-channel attack.

In some embodiments, the cryptographic algorithm may be a block cipher algorithm. The corresponding cryptographic function may be a substitution box and the corresponding secret cryptographic key may be a symmetric key.

In particular embodiments, the block cipher algorithm may be the advanced encryption standard algorithm.

There is also provided a method for determining an estimate of at least one secret cryptographic key used during a number of executions of a cryptographic function used by at least one cryptographic algorithm. The number of executions of the cryptographic function is at least equal to two.

The estimation method may comprise determining a plurality of sets of leakage traces from a side-channel information acquired during the number of executions of the cryptographic function. Each set of leakage traces comprising at least one leakage trace.

The estimation method may comprise determining a statistical distribution of the plurality of sets of leakage traces. The statistical distribution is dependent on a leakage function. The leakage function is represented in a canonical basis of functions by a set of real values. The estimation method may further comprise determining the at least one secret cryptographic key from the determined statistical distribution of the plurality of sets of leakage traces using an estimation algorithm according to the maximization of a performance metric.

The various embodiments of the invention thus provide side-channel analysis techniques adapted to cryptographic implementations running more than two executions of a same cryptographic function. In particular, various embodiments of the invention advantageously allow an efficient joint analysis of side-channel information by exploiting and optimally combining all leakage traces acquired during the several executions of cryptographic functions. Further, according to the embodiments of the invention, secret key estimation takes into account all the traces, in contrast to existing methods that only use specific traces that correspond to internal collisions. As a result, higher success recovery rates of the cryptographic secret key may be reached for a given number of traces.

The various embodiments of the invention further provide efficient side-channel analysis techniques which are immune to leakage modeling errors and which are robust against high inhomogeneity of the leakage behavior.

It is also an advantage of the invention to provide optimal performances, as well as the highest resistance and robustness in case of masked cryptographic implementations.

The various methods and devices of the invention may be used as an efficient reverse engineering tool aiming at recovering algorithmic components and leakage models of unique cryptographic implementations.

Further advantages of the present invention will become clear to the skilled person upon examination of the drawings and detailed description. It is intended that any additional advantages be incorporated herein.

DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention provide methods and devices for side-channel analysis of cryptographic implementations against one or more side-channel attacks. In particular, embodiments of the invention provide methods and devices for determining at least one estimate of a secret cryptographic key used during a number of executions of a cryptographic function used by a cryptographic algorithm from side-channel leakage information. The leaked information from the analyzed cryptographic system is characterized by a statistical distribution of a plurality of sets of leakage traces. The statistical distribution depends on a leakage function. The leakage function is represented in a canonical basis of functions by a set of unknown values.

Figure 1:
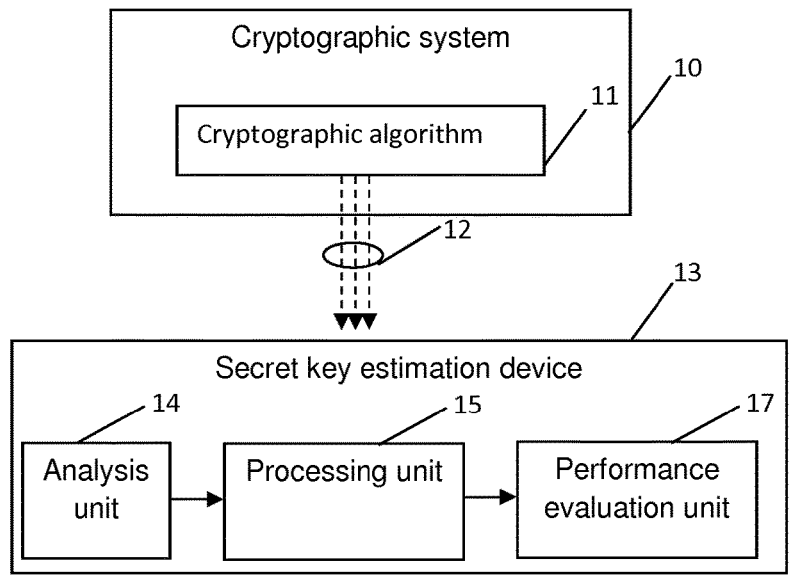
FIG. 1 is a schematic diagram of an implementation of a secret key estimation device.

Referring to FIG. 1, there is shown an exemplary implementation of a secret key estimation device 13, according to certain embodiments. The secret key estimation device 13 may be implemented to evaluate the security level and vulnerability of the cryptographic system 10 against one or more side-channel attacks during a number of executions of a cryptographic function implemented in a cryptographic algorithm 11 by exploring the acquired side-channel information 12 during a number of executions of the cryptographic function.

Secret value estimation methods and devices according to the various embodiments of the invention may be deployed in the design, manufacturing or certification process to evaluate the security level of a manufactured cryptographic system 10. The cryptographic system 10 may be any information system or device implementing a cryptographic algorithm 11 for ensuring data protection and/or security. The cryptographic algorithm 11 may use a secret cryptographic key for hiding the content of data/information in the form of a "ciphertext".

The cryptographic system 10 may be used in various storage, information processing or communication systems. For example, in a storage system application of the invention, the cryptographic system 10 may represent any fixed or mobile storage device such as memory cards or hard discs with logon access monitored by cryptographic algorithms. In information processing applications of the invention, the cryptographic system 10 may be for example a computer system, a database, an online sale system or a financial system implementing a cryptographic algorithm 11 for securing data that are to be exchanged or stored in the system, such as personal financial or medical data. In an application of the invention to communication systems, the cryptographic system 10 may be for example a user terminal, a relay or a base station deployed in wireless communication networks, the cryptographic system 10 implementing the cryptographic algorithm 11 for ensuring data security during its transit over unsecure communication media.

Each cryptographic algorithm 11 implemented in the cryptographic system 10 may be associated with an indicator of successful extraction of the secret cryptographic key and a degree of security of the system against side-channel attacks. Such parameters may depend on the leakage model characterization and/or on the calculation algorithms used to determine estimates of the used secret key(s), also referred to hereinafter as "distinguishers".

The various embodiments of the invention provide secret key estimation methods and devices that do not require any a priori knowledge on the leakage behavior of the cryptographic system. The determination of an estimate of the used cryptographic key may be optimally performed by exploiting the leakage information acquired during the different executions of the cryptographic function.

The following description of certain embodiments will be made with reference to an application of the invention to a communication system, for illustration purposes only. However, the skilled person will readily understand that the various embodiments of the invention may be applied to other types of systems such as data processing or storage systems.

Figure 2:
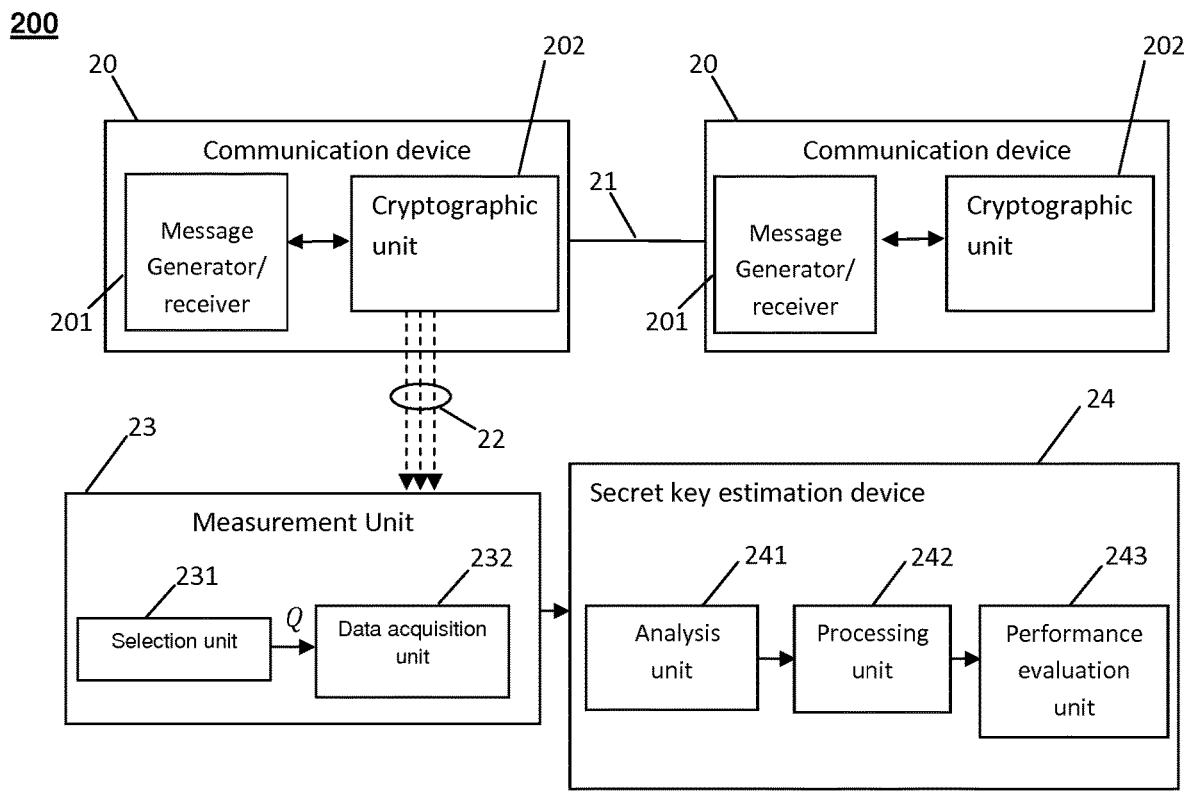
FIG. 2 is a block diagram illustrating a detailed structure of a secret key estimation device according to an exemplary embodiment of the present invention.

Referring to FIG. 2, there is shown an exemplary implementation of methods and devices for estimating at least one secret key for use by a communication device 20 comprised in a communication system 200. The communication device 20 may be a fixed device, such as a computer operating in a wired communication system, or a mobile device, such as user terminals operational in wireless networks. The communication device 20 may comprise for example:

A Message generator or a message receiver 201 respectively configured to generate output data or receive input data (for example in the form of a signal or a message);

A cryptographic unit 202 implementing a cryptographic algorithm for performing one or more cryptographic operations.

As used herein, a cryptographic operation designates a specific cryptographic processing or function configured to perform a specific task in a cryptographic implementation. Exemplary cryptographic operations comprise data encryption/decryption, message authentication, cryptographically secure pseudorandom number generation, digital signature and cryptographic hash functions calculation.

In exemplary embodiments where the cryptographic unit 202 is configured to perform encryption/decryption, the cryptographic unit 202 may implement at least one cryptographic algorithm using at least one cryptographic secret key. An encryption process or function refers to an encoding of messages or information delivered by the message generator/receiver 201 into a text, referred to as "a ciphertext". The ciphertext is encoded such that a receiver can only read it if it holds the cryptographic key used to generate the ciphertext. A decryption process or function designates the reverse operation which allows recovering the original text from an encrypted message.

In one embodiment of the invention, the cryptographic algorithm used to encrypt/decrypt data may be a symmetric-key cryptographic algorithm which reuses a same instance of a cryptographic function several times. The repeated calls to the same cryptographic function using different input values or messages may be advantageously exploited for estimating some properties of the cryptographic implementation. Examples of such embodiment comprise block ciphers, like the AES algorithm, which reuse the same instance of a substitution box (noted "S-Box") during a number of L executions, with L being at least equal to two. A substitution box is a basic component key-based cryptographic function which performs substitution.

In another embodiment of the invention, the cryptographic algorithm may execute several instances of various cryptographic functions simultaneously. Hardware cryptographic implementations of block ciphers are exemplary applications of such embodiments.

The communication device 20 may be configured to communicate secured data with at least another communication device 20 through a communication interface 21. The communication interface 21 may be for example a wired link, a wireless propagation medium or an optical connection.

The side-channel 22 schematically represents the information leaked from the communication device 20. Leaked information may be for example the power consumption of the communication device 20 during an encryption/decryption process, the processing time required to perform a given cryptographic operation, the electromagnetic emanations, sound or infrared radiations emitted by the communication device 20, etc. Such leaked information may be represented by a series of values (referred to as "side-channel traces"). Leaked information may statistically reveal certain characteristics related to the cryptographic algorithm running in the cryptographic unit 202.

Side-channel leaked information 22 may be collected by a measurement unit 23 configured to gather a plurality of sets of trace measurements from the leaked information during the run time of the communication device 20. The measurement unit 23 may comprise:

a selection unit 231 configured to determine the number Q of traces to be collected for each set of leakage traces;

a data acquisition unit 232 configured to collect samples of traces from the leaked information from the communication device 20. The data acquisition unit 232 may be for example a high speed equipment such as a modern digital oscilloscope with high speed analog-to-digital captures or any instrument equipped with a set of sensors (passive or active) configured to detect physical properties of the communication device 20 from the leaked information 22 such as voltage, current, power, electromagnetic probes, or temperature or acoustic sensors, etc.

In certain embodiments where the cryptographic unit 202 implements a block cipher which uses a same instance of a substitution box for a number of executions $L \geq 2$, the measurement unit 23 may be configured to collect a number of sets of leakage traces lower than or equal to L. For each execution of the substitution box (in general a cryptographic function), the measurement unit 23 may be configured to collect a set of Q traces. In such embodiments, successive calls to the substitution box may be separated by at least one clock period.

In certain embodiments, the selection unit 231 may be configured to determine the number Q of acquired leakage traces in each set of traces depending on the signal-to-noise ratio to take into account the level of the noise.

In other embodiments, the selection unit 231 may be configured to determine the number Q of acquired leakage traces in each set of traces depending on a target performance metric.

The collected traces may be then delivered to the secret key estimation device 24 for determining at least one estimation of a secret key from the sets of leakage traces.

In one embodiment, the secret key estimation device 24 may comprise:

an analysis unit 241 configured to process the acquired sets of leakage traces for removing alignment errors, highlighting signals and/or reducing the noise level;

a processing unit 242 configured to determine a statistical distribution of the collected sets of leakage traces from the data processed by the analysis unit 241. The processing unit 242 may be further configured to generate estimate(s) of secret key(s) using an estimation algorithm and according to the maximization of a performance metric;

a performance evaluation unit 243 configured to calculate a performance metric for measuring the efficiency of the estimation algorithm and the vulnerability of the communication device 20 against one or more side-channel attacks.

In certain embodiments, the processing unit 242 may be configured to determine the statistical distribution of the collected sets of leakage traces depending on a leakage function.

In some embodiments, the processing unit 242 may be configured to determine the statistical distribution of the collected sets of leakage traces depending on a noise of a known covariance matrix.

In one embodiment, the leakage function may be represented in a canonical basis of functions by a set of real values of unknown values.

In one embodiment, the processing unit 242 may be configured to generate estimate(s) of secret keys according to the maximization of the probability of success of key recovery. In such embodiments, the performance evaluation unit 243 may be configured to measure the security level of the communication device 20 by determining the success rate or the rate of successful recovery of the secret key(s) implemented by the cryptographic unit 202. Accordingly, in embodiments where the leakage function is represented in a canonical basis of functions by a set of unknown real values, the processing unit may be further configured to determine estimates of the unknown real values jointly with the estimation of the secret key(s). The processing unit 242 may use an iterative algorithm such as the EM algorithm to jointly determine these estimates.

According to the various embodiments of the invention, there is provided methods and devices for an efficient side-channel analysis of a cryptographic implementation with particular algebraic properties. In particular, the analyzed cryptographic implementation may run various executions or iterative calls of a same cryptographic function, a number $L \geq 2$ of times. In contrast to collision attacks that consider only leakage traces corresponding to internal collisions, various embodiments of the invention provide effective and optimal side-channel analysis methods and devices by exploiting the leakage information corresponding to the total executions of the cryptographic function.

Figure 3:
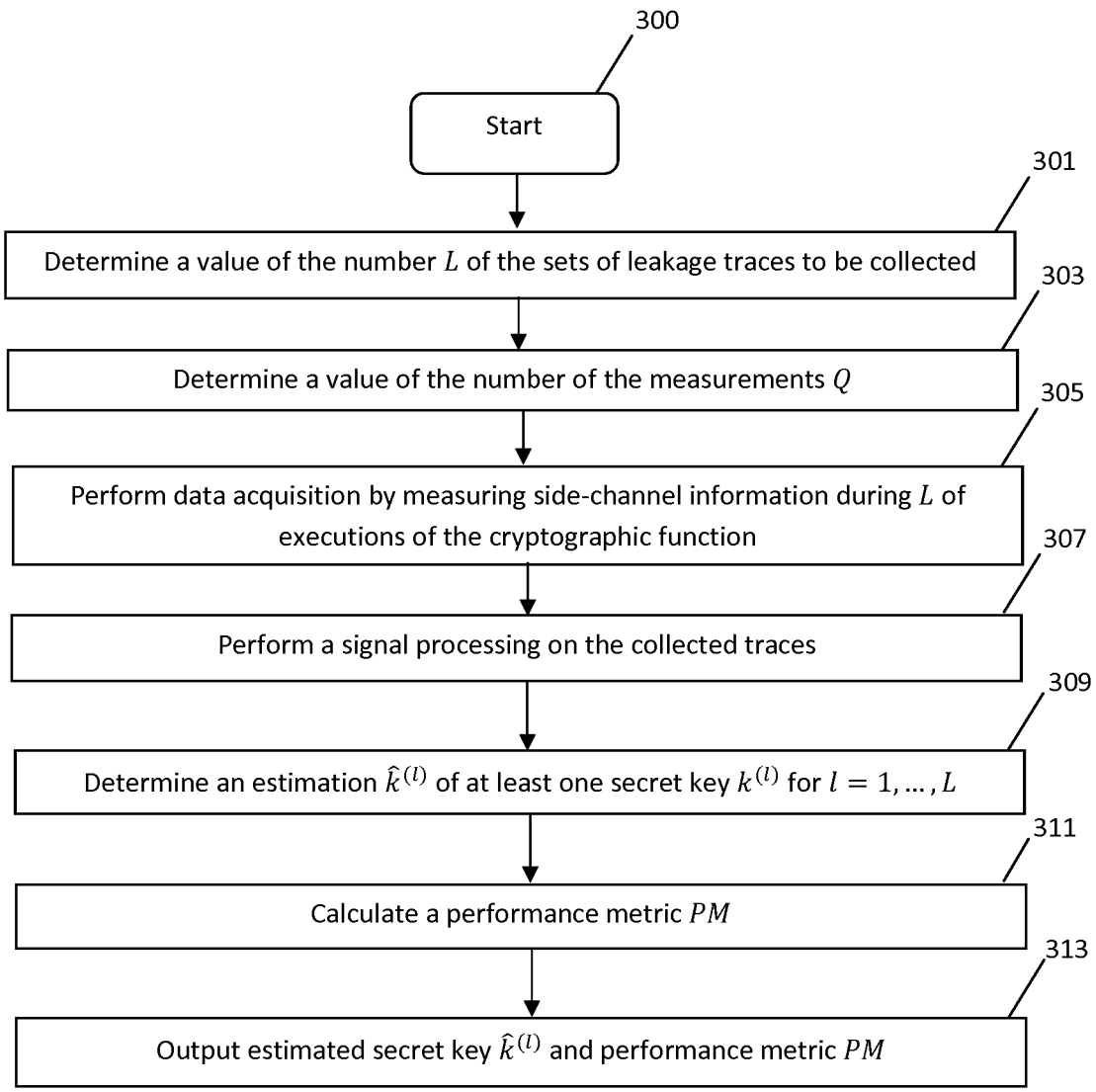
FIG. 3 is a flowchart depicting a method of secret key estimation according to an exemplary embodiment of the present invention.
Figure 4:
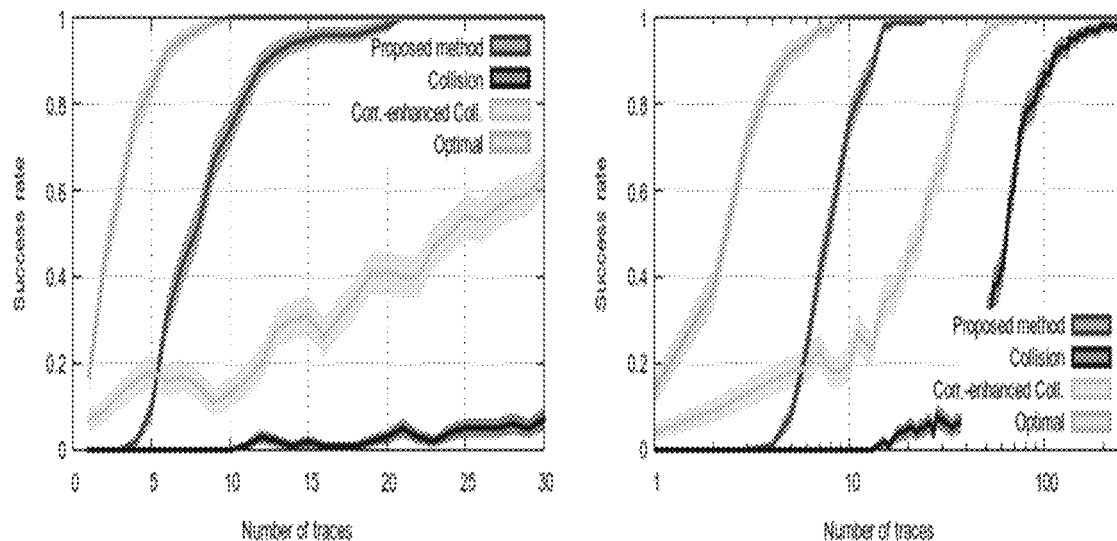
FIGS. 4a-4d depict several diagrams illustrating the success rate obtained using the secret key estimation method according to certain embodiments.
Figure 4:
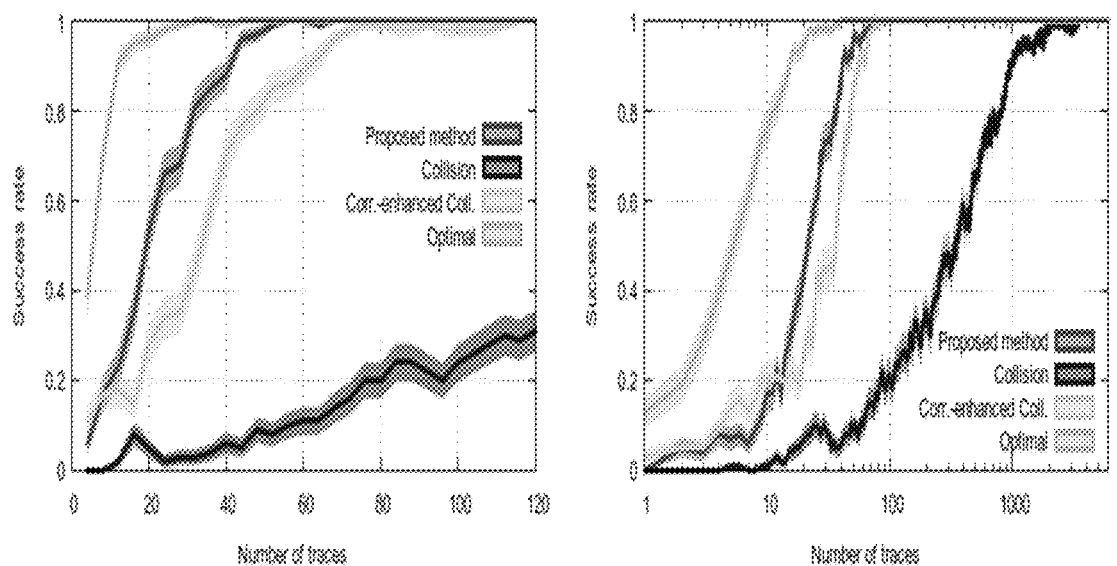
Figure 4C:
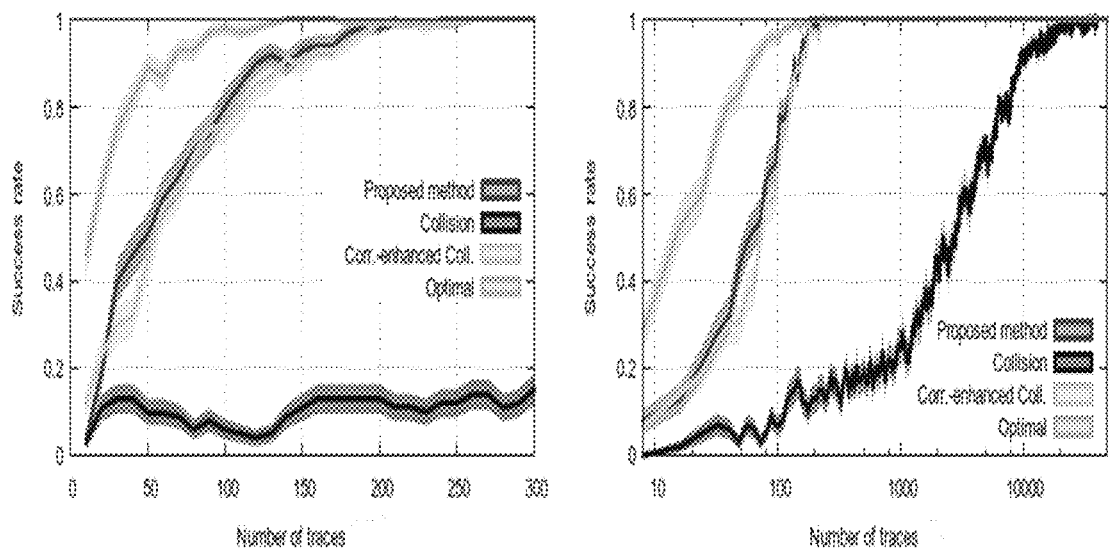
Figure 4D:
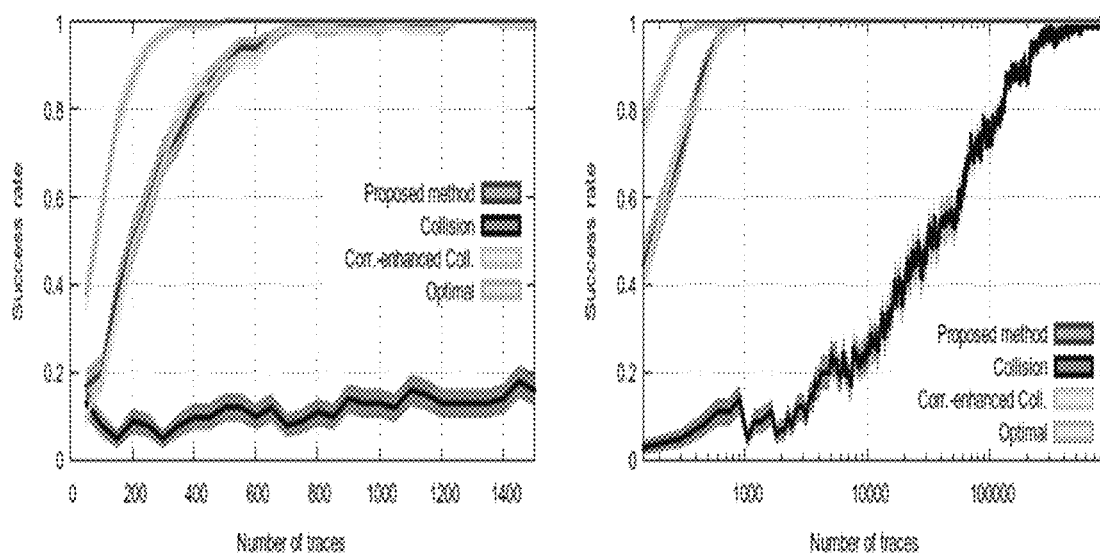

FIG. 3 is a flowchart illustrating a secret key estimation method according to an exemplary embodiment of the invention for performing a side-channel analysis and security evaluation of a cryptographic implementation based on a cryptographic algorithm that reuses a same instance of a cryptographic function several times. The secret key estimation method is carried out based on a cryptographic operation previously loaded and run on the analyzed cryptographic device, for example a system analyzer or administrator.

The following description will be made with reference to block ciphers cryptographic algorithms that reuse a same instance of a substitution box during a number of executions L that is at least equal to two for data encryption, for illustration purpose only. However, the skilled person will readily understand that certain embodiments described hereinafter may be also applied to any cryptographic operation using any cryptographic algorithm based on several calls of a given cryptographic function.

In step 300, a cryptographic operation is triggered in the analyzed cryptographic implementation which can run one or more block cipher cryptographic algorithm. A block cipher cryptographic algorithm may execute a same substitution box L times with $L \geq 2$. At each execution of the substitution box, a set of messages or text data, referred to commonly hereinafter as 'plaintext', may be generated. A cryptographic key may be used at each execution of the substitution box to encrypt the plaintexts into ciphertexts. The secret keys used during the number of the executions of the substitution box and the original data may be represented by bit vectors, each vector comprising n bits. Each secret key may be a deterministic variable while the original data may be random. The cryptographic key used at the $l^{th}$ execution of the substitution box is denoted as $k^{(l)} \in \{0,1\}^n$. The knowledge of the plaintexts by the system administrator, without any a priori knowledge on the secret keys, is assumed.

In addition, the secret keys may be masked using a set of unpredictable random masks. A random mask may be represented by a bit vector comprising n bits. The mask may be internally generated by the block cipher. The mask used at the $l^{th}$ execution of the substitution box is denoted as $m^{(l)} \in \{0,1\}^n$. A same or different mask may be used for the various executions of the substitution box.

In step 301, the number of sets of leakage traces to be collected may be determined.

In certain embodiments, the number of sets of leakage traces may be determined from the number of executions of the substitution box. In particular, the number of sets of leakage traces may be advantageously equal to the number L of the executions of the substitution box.

The following description will be made with reference to exemplary embodiments where the number of sets of leakage traces to be collected is equal to the number of executions of the substitution box for illustration purpose only.

In step 303, the number Q of the trace measurements to be collected from the leaked information at each execution of the substitution box may be determined. The number Q may be greater or equal to one (1). The number Q may depend on the signal-to-noise ratio denoted by SNR. In certain embodiments, the number Q of the trace measurements may further be determined according to a target performance measure or metric.

Given the determined number of measurements for each execution of the substitution box, L sets of leakage traces comprising each Q traces may be acquired in step 305 during the L executions of the substitution box. Accordingly, the total number of leakage traces to be collected and analyzed while executing L times the same instance of the substitution box is equal to the product of Q by L (Q×L). Data acquisition may be performed through a temporal series of a set of discrete samples. For most cryptographic devices, the leakage signal may be represented as a continuous curve. In certain embodiments, it may be further needed that the measurement conditions remain strictly the same and that the bandwidth of the acquisition tools be large enough such that any two successive acquired traces remain independent and such that the noise altering the measurement environment has the same probability distribution for all measured data.

Accordingly, for the $l^{th}$ execution, a set of Q plaintexts is generated and processed using the secret cryptographic key $k^{(l)}$. The plaintext corresponding to the $q^{th}$ query of the $l^{th}$ execution is denoted as $t_q^{(l)}$ for $q=1, \ldots, Q$ and $l=1, \ldots, L$. The generated messages L×Q are assumed known by the system analyzer or administrator. The sets of L keys $k^{(1)}, \ldots, k^{(L)}$ are estimated from the acquired total number of L×Q leakage traces.

The signals corresponding to the collected L×Q traces may be then processed in step 307 to improve the data outcome, highlight signals and/or reduce the noise level. The processed leakage traces may be represented by the real value measurements matrix $x^{(\cdot)} \in \mathbb{R}^{Q \times L}$.

The measurements matrix may be written in the form $x^{(\cdot)} = (|x^{(1)}| \ldots |x^{(l)}| \ldots x^{(L)})$ where a column vector $x^{(l)} = (x_1^{(l)}, \ldots, x_Q^{(l)})^t \in \mathbb{R}^Q$ of index l comprises the Q traces acquired during the $l^{th}$ execution of the substitution box. Similarly, $k^{(\cdot)} = (k^{(1)} \ldots k^{(l)} \ldots k^{(L)})$ denotes the set of the secret keys processed during the different executions of the substitution box. Alternatively, the measurements matrix may be written in the form $x^{(\cdot)} = (x_1^{(\cdot)}, \ldots, x_q^{(\cdot)}, \ldots, x_Q^{(\cdot)})^t$ where a row vector $x_q^{(\cdot)} = (x_q^{(1)}, \ldots, x_q^{(L)}) \in \mathbb{R}^L$ of index q comprises the L traces of index q corresponding to the total number L of the executions of the substitution box. According to the two notations, the leakage trace corresponding to the $q^{th}$ query of the $l^{th}$ execution of the substitution box is denoted as $x_q^{(l)}$ and may be expressed as:

$$x_q^{(l)} = \varphi(t_q^{(l)} \oplus k^{(l)}) + n_q^{(l)}, l=1,\ldots,L, q=1,\ldots Q \quad (1)$$

In equation (1), $\varphi$ designates a deterministic leakage function unknown by the system analyzer and assumed to be identical for all executions of the substitution box. $t_q^{(l)}$ and $n_q^{(l)}$ designate respectively the generated plaintext and a noise modeling the environment in which is carried out the side-channel analysis and corresponding to the $q^{th}$ query of the $l^{th}$ execution of the substitution box.

The leakage function $\varphi: \{0,1\}^n \to R$ is a pseudo-Boolean function that can be seen as a $2^n$-dimensional vector $\varphi(.) \in R^{2^n}$ where $R^{2^n}$ designates the finite-dimensional Euclidean space equipped with the canonical scalar product. $>$ such that for two vectors $\varphi_1$ and $\varphi_2$ their scalar product is given by $\varphi_1, \varphi_2 > \Sigma_z \varphi_1(z) \varphi_2(z)$.

The noise distribution is assumed to be known from the system analyzer and assumed independent and identically distributed zero-mean Gaussian of known covariance. Accordingly, the noise vector $n_q^{(\cdot)} = (n_q^{(1)},\ldots,n_q^{(L)})$ associated to the traces vector $x_q^{(\cdot)}$ is statistically distributed according to the probability density function $p_{N_q^{(\cdot)}}(n_q^{(\cdot)})$ given by:

$$p_{N_q^{(\cdot)}}(n_q^{(\cdot)}) = \frac{1}{\sqrt{(2\pi)^L |\Sigma|}} \exp\left(\frac{-1}{2} n_q^{(\cdot)t} \Sigma^{-1} n_q^{(\cdot)}\right) \quad (2)$$

In equation (2), $\Sigma \in R^{L \times L}$ designates the known covariance matrix, the superscript $(.)^t$ denotes the transpose operation and $|\Sigma|$ and $\Sigma^{-1}$ denote respectively the determinant and the inverse of the matrix $\Sigma$.

Accordingly, in the presence of Gaussian noise, each leakage trace $x_q^{(l)}$, $q=1,\ldots, Q$; $l=1,\ldots, L$ given the deterministic leakage function $\varphi$ is normally distributed. The trace vector $x_q^{(\cdot)}$ is distributed according to the Gaussian distribution $N(\varphi(t_q^{(\cdot)} \oplus k^{(\cdot)}), \Sigma)$ of probability density function given by:

$$p_{X_q^{(\cdot)}}(x_q^{(\cdot)} \vee \varphi, t_q^{(\cdot)}, k^{(\cdot)}) = p_{N_q^{(\cdot)}}(x_q^{(\cdot)} - \varphi(t_q^{(\cdot)} \oplus k^{(\cdot)})) \quad (3)$$

In other embodiments of the invention, the noise may be uniformly distributed or modeled by a Laplacian distribution.

In certain embodiments implementing masked cryptographic functions, and in particular when a same mask is used for all the executions of the substitution box $m^{(l)} = m$, $l=1,\ldots, L$, the leakage trace in equation (1) may be written as:

$$x_q^{(l)} = \varphi(S(t_q^{(l)} \oplus k^{(l)}) \oplus m) + n_q^{(l)}, l=1,\ldots,L, q=1,\ldots Q \quad (4)$$

In equation (4), S designates the substitution box and $m \in \{0,1\}^n$ stands for the mask. The trace vector $x_q^{(\cdot)}$ in such embodiments is distributed according to the Gaussian distribution $N(\varphi(S(t_q^{(\cdot)} \oplus k^{(\cdot)}) \oplus m), \Sigma)$ of probability density function given by:

$$p_{X_q^{(\cdot)}}(x_q^{(\cdot)} \vee \varphi, t_q^{(\cdot)}, k^{(\cdot)}) = \Sigma_{m=0}^{2^n-1} P(M=m) p_{X_q^{(\cdot)}}(x_q^{(\cdot)} \vee \varphi, t_q^{(\cdot)}, k^{(\cdot)}, m) \Sigma_{m=0}^{2^n-1} P(M=m) p_{N_q^{(\cdot)}}(x_q^{(\cdot)} - \varphi(S(t_q^{(\cdot)} \oplus k^{(\cdot)}) \oplus m)) \quad (5)$$

In equation (5), $P(M=m)$ denotes the probability of observing the mask m. In general, the distribution of the mask is uniform (such implementations are said to be perfectly masked). However, for the sake of efficiency, it is possible to encounter non-uniform mask distributions, such as for instance in the low-entropy masking schemes.

Given the statistical distribution of the totality of the acquired leakage traces during the total number of executions of the substitution box, an estimation of at least one secret cryptographic key may be determined in step 309. An estimation algorithm (also called "distinguisher") may be implemented in step 309 to determine the estimate(s) of the secret keys according to the optimization of a performance metric. A distinguisher $D(t^{(\cdot)}, x^{(\cdot)})$ is a function which returns key(s) estimation(s) given the set of known texts $t^{(\cdot)}$ and the measured leakages $x^{(\cdot)}$. It may be considered as a map from $(\{0,1\}^n)^{Q \times L} R^{Q \times L}$ to $(\{0,1\}^n)^L$.

In certain embodiments, Maximum Likelihood distinguishers may be implemented in step 309. The ML distinguisher denoted as $D_{opt}$ enables, when the different key values are uniformly distributed over $\{0,1\}^n$, for the maximization of the probability of success recovery of the secret key(s).

The ML distinguishers may be generally expressed by:

$$D_{opt}(t^{(\cdot)}, x^{(\cdot)}) = \underset{k^{(\cdot)} \in (\{0,1\}^n)^L}{\operatorname{argmax}} \left( \underset{\varphi: \{0,1\}^n \to R}{\max} (L(k^{(\cdot)}, \varphi)) \right) \quad (6)$$

In equation (6), the function $L(k^{(\cdot)}, \varphi)$ designates a "logarithmic likelihood function".

The logarithmic likelihood function may be expressed as function of the statistical distribution of the acquired leakage traces according to:

$$L(k^{(\cdot)}, \varphi) = \log(p_{X^{(\cdot)}}(x^{(\cdot)} \vee \varphi, t^{(\cdot)}, k^{(\cdot)})) = \log(\Pi_{q=1}^Q p_{X_q^{(\cdot)}}(x_q^{(\cdot)} \vee \varphi, t_q^{(\cdot)}, k^{(\cdot)})) \Sigma_{q=1}^Q \log(p_{X_q^{(\cdot)}}(x_q^{(\cdot)} \vee \varphi, t_q^{(\cdot)}, k^{(\cdot)})) \quad (7)$$

In embodiments where the secret keys are masked using a same mask, the likelihood function in equation (7) may be further expressed as:

$$L(k^{(\cdot)}, \varphi) = \Sigma_{q=1}^Q \log(\Sigma_{m=0}^{2^n-1} P(M=m) p_{N_q^{(\cdot)}}(x_q^{(\cdot)} - \varphi(S(t_q^{(\cdot)} \oplus k^{(\cdot)}) \oplus m))) \quad (8)$$

In the presence of masked implementations using equiprobable mask values (i.e. $(M=m)=\frac{1}{2^n}$) and Gaussian noise, combining equations (2), (5) and (8), the likelihood function may be expressed as:

$$L(k^{(\cdot)}, \varphi) = \Sigma_{q=1}^Q \log(\Sigma_{m=0}^{2^n-1} \exp(-\frac{1}{2}(x_q^{(\cdot)} - \varphi(S(t_q^{(\cdot)} \oplus k^{(\cdot)}) \oplus m))^t \Sigma^{-1}(x_q^{(\cdot)} - \varphi(S(t_q^{(\cdot)} \oplus k^{(\cdot)}) \oplus m)))) \quad (9)$$

In particular embodiments, the noise may be isotropic, for which the covariance matrix may be written in the form $\Sigma = \sigma^2 I_L$ where $I_L$ is the identity matrix of dimensions $L \times L$. In such embodiments, the likelihood function in equation (9) may be simplified to:

$$L(k^{(\cdot)}, \varphi) = \sum_{q=1}^Q \log\left( \sum_{m=0}^{2^n-1} \exp\left( \frac{-1}{2\sigma^2} \|x_q^{(\cdot)} - \varphi(S(t_q^{(\cdot)} \oplus k^{(\cdot)}) \oplus m)\|^2 \right) \right) \quad (10)$$

Now, using the expression of the individual leakage traces, the likelihood function in equation (10) may be written as:

$$L(k^{(\cdot)}, \varphi) = \sum_{q=1}^Q \log\left( \sum_{m=0}^{2^n-1} \exp\left( \frac{-1}{2\sigma^2} \sum_{l=1}^L (x_q^{(l)} - \varphi(S(t_q^{(l)} \oplus k^{(l)}) \oplus m))^2 \right) \right) \quad (11)$$

The ML distinguisher accordingly, in the case of masked implementations in the presence of Gaussian isotropic noise may be written as:

$$D_{opt}(t^{(\cdot)}, x^{(\cdot)}) = \underset{k^{(\cdot)} \in \{0,1\}^n)^L}{\operatorname{argmax}} \quad (12)$$

$$\max_{\varphi:\{0,1\}^n \to R} \sum_{q=1}^{Q} \log \left( \sum_{m=0}^{2^n-1} \exp\left( \frac{-1}{2\sigma^2} \sum_{l=1}^{L} (x_q^{(l)} - \varphi(S(t_q^{(l)} \oplus k^{(l)}) \oplus m))^2 \right) \right)$$

The optimization problem solved by the optimal ML distinguisher in equation (12) involves a double maximization with respect to the leakage function $\varphi$ and the secret keys $k^{(l)}$, $l=1, \ldots, L$. Solving this double optimization problem may be performed simultaneously on the pair $(k^{(\cdot)}, \varphi)$. Alternatively, the resolution of equation (12) may be performed by seeking first the optimal leakage function solution of the inner maximization problem followed by finding the optimal keys forming the solution of the outer optimization problem in the form of a set of keys $k^{(\cdot)}$.

The ML distinguisher in equation (12) also applies in situations where masking is desactivated or not implemented. The corresponding expression of the ML distinguisher may be in this case simplified and given by:

$$D_{opt}(t^{(\cdot)}, x^{(\cdot)}) = \underset{k^{(\cdot)} \in \{0,1\}^n)^L}{\operatorname{argmin}} \min_{\varphi:\{0,1\}^n \to R} \sum_{q=1}^{Q} \sum_{l=1}^{L} (x_q^{(l)} - \varphi(t_q^{(l)} \oplus k^{(l)}))^2 \quad (13)$$

Both optimization problems in equations (12) and (13) involve an optimization over all leakage functions $\varphi$: $\{0,1\}^n \to R$. According to some embodiments of the invention where the leakage function is assumed unknown by the system analyzer, the resolution of these optimization problems may be performed by representing the unknown leakage function $\varphi$ in the canonical basis of functions. In such embodiments, the leakage function space may be represented using the canonical basis (which is orthonormal) denoted as $(\delta_u)_{u \in \{0,1\}^n}$ such that:

$$\delta_u(z) = \begin{cases} 1 & \text{if } z = u \\ 0 & \text{otherwise} \end{cases} \quad (14)$$

Accordingly, the leakage function $\varphi$ can be decomposed in the canonical basis in the form $\varphi(z) = \sum_{u \in \{0,1\}^n} \varphi(u) \delta_u(z)$.

Based on this decomposition, the expression of the ML distinguisher in equation (12) in embodiments using masked cryptographic keys and in the presence of isotropic Gaussian noise may be expressed as:

$$D_{opt}(t^{(\cdot)}, x^{(\cdot)}) = \quad (15)$$

$$\underset{k^{(\cdot)} \in \{0,1\}^n)^L}{\operatorname{argmax}} \max_{a \in R^{2^n}} \sum_{q=1}^{Q} \log \left( \sum_{m=0}^{2^n-1} \exp\left( \frac{-1}{2\sigma^2} \sum_{l=1}^{L} \left( x_q^{(l)} - a_{S(t_q^{(l)} \oplus k^{(l)}) \oplus m} \right)^2 \right) \right)$$

In equation (15), the variable $a \in R^{2^n}$ in the inner optimization problem is associated with the decomposition of the leakage function in the canonical basis of functions such that $a = (\varphi(u))_{u \in \{0,1\}^n}$.

Similarly, in embodiments where no masking is applied, the optimal ML distinguisher in equation (13) may be expressed as:

$$D_{opt}(t^{(\cdot)}, x^{(\cdot)}) = \quad (16)$$

$$\underset{k^{(\cdot)} \in \{0,1\}^n)^L}{\operatorname{argmin}} \min_{a \in R^{2^n}} \sum_{q=1}^{Q} \sum_{l=1}^{L} \left( x_q^{(l)} - \sum_{u \in \{0,1\}^n} a_u \delta_u(t_q^{(l)} \oplus k^{(l)}) \right)^2$$

Using the optimization problems of equations (15) and (16), solving for the optimal leakage function $\varphi$ is equivalently performed by solving for the optimal components of the vector $a \in R^{2^n}$.

According to certain embodiments, iterative algorithms may be implemented to solve the optimization problems in equations (15) and (16) enabling for jointly determining estimates of the unknown parameters of the leakage function as well as estimates of the secret cryptographic key(s). Exemplary iterative algorithms comprise expectation maximization (EM) algorithms. An EM algorithm is an iterative algorithm used in statistics for parameters estimation in statistical models when the random variables involved in the models comprise wholly or partially unknown parameters. For example in the case of masked implementations, given the set of acquired leakage traces $x_q^l$ during the L executions of the substitution box, the set of mask values $m=0, \ldots, 2^n-1$ and the unknown coefficients defining the vector $a \in R^{2^n}$, EM algorithms operate by iteratively alternating between an expectation step and a maximization step until a convergence of the estimated parameters to local maxima. During the expectation step, the EM algorithm evaluates the expected value of the logarithmic likelihood function with respect to the conditional distribution of m given $x_q^{(l)} - a_{S(t_q^{(l)} \oplus k^{(l)}) \oplus m}$ parameters in the vector a. During the maximization step, the algorithm finds the parameters of the vector a that maximize the expected logarithmic likelihood function evaluated in the expectation step.

In response to the estimation of the secret key(s) in step 309, a performance metric PM may be calculated in step 311. In certain embodiments, a security metric such as the success rate evaluating the rate of successful recovery of the secret key(s) may be used. The rate of successful recovery of secret cryptographic keys is associated with a probability of error representing the probability that the estimated secret keys $\hat{k}^{(1)}, \ldots, \hat{k}^{(L)}$ are different from the correct keys $k^{(1)}, \ldots, k^{(L)}$ according to:

$$P_e = Pr(l=1, \ldots, L\hat{k}^{(l)} \neq \hat{k}^{(1)}) \quad (17)$$

In step 313, the estimated secret keys and the performance metric PM may be output.

FIGS. 4a-4d depict simulation results evaluating the performance of the proposed ML distinguisher (referred to in the legend as 'Proposed method') in terms of success rate according to certain embodiments of the invention for a side-channel analysis of a cryptographic implementation based on the PRESENT block cipher algorithm which uses a 4-bits substitution box S (n=4. Simulations are performed under the assumption of a leakage model given by the composition of the Hamming weight leakage model and the substitution box such that the leakage function is given by: $\varphi = W_H \circ S$. The noise is assumed centered and of variance $\sigma 2$.

The success rate performance is evaluated for different noise variance values: $\sigma=0$ in sub-figures (a), $\sigma=1$ in sub-figures (b), $\sigma=2$ in sub-figures (c) and $\sigma=3$ in sub-figures (d). In addition, the success rate is evaluated considering different number of traces and is compared to the success rate performance of template attacks (referred to in the legend as 'Optimal'), classical collision attacks (referred to in the legend as 'Collision') and correlated enhanced attacks (referred to in the legend as 'Corr.-enhanced Coll.'). Template attacks are performed on one substitution box and require the knowledge of the leakage model.

The numerical results depicted in FIGS. 4a-4d show the outperformance of the ML distinguisher according to certain embodiments of the invention over the correlation-enhanced collision attacks for low noise and small number of leakage traces. In addition, the success rate performances achieved by the proposed ML distinguisher approach the performances provided by Template attacks, while not requiring any a priori knowledge on the leakage behavior.

Figure 5:
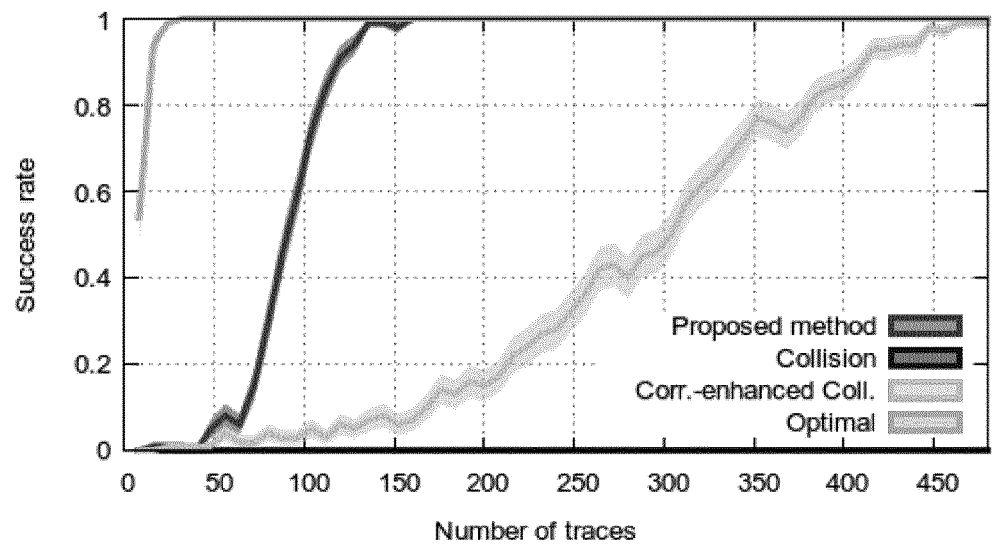
FIG. 5 is a diagram illustrating the success rate obtained using the secret key estimation method according to certain embodiments.

Further, a side-channel analysis under the same hypotheses considered for the simulations illustrated in FIGS. 4a-4d are performed on real traces collected from a masked implementation of the AES cipher algorithm with a perfect knowledge of the masks values related to each leakage trace. FIG. 5 illustrates the success rate performance which is obtained for a noise variance $\sigma=1$. The results depicted in FIG. 5 relate to an evaluation of the performance in the AES case. Such result match the results obtained with the PRESENT algorithm. The ML distinguisher according to certain embodiments thus provides higher success rate than conventional collision and correlation-enhanced collision techniques.

It should be noted that the examples of FIGS. 4a-4d and 5 are simplified examples for illustrating the success rate which can be obtained with the present invention and are not intended to limit the scope of the invention.

While certain embodiments of the invention have been described in application to the analysis of the side-channel leakage information associated to leaked information from a cryptographic device implementing a same cryptographic function during several times, it should be noted that the invention is not limited to such application. For example, the invention also applies to the side-channel analysis of cryptographic implementations using various cryptographic functions in parallel, at the same time. This is the case for example of hardware implementations of block ciphers where various substitution boxes may be instantiated in parallel. In such embodiments, the measurement unit 23 may be configured to aggregate information leaked from the communication device 20 simultaneously. In such embodiments and where no masking is applied, the acquired leakage may be represented as a single trace expressed as:

$$x = \sum_{l=1}^{L} \varphi(t^{(l)} \oplus k^{(l)}) + n \quad (18)$$

Accordingly, the optimal distinguisher in equation (13) may be expressed in hardware embodiments as:

$$D_{opt}(t^{(\cdot)}, x) = \underset{k^{(\cdot)} \in (\{0,1\}^n)^L}{\operatorname{argmin}} \underset{\varphi:\{0,1\}^n \to R}{\min} \left( x_q - \sum_{l=1}^{L} \varphi(t_q^{(l)} \oplus k^{(l)}) \right)^2 \quad (19)$$

Equations (18) and (19) correspond to block ciphers with no masking schemes. However, the skilled person will readily understand that similar results can be derived in embodiments where the block ciphers implement masks.

Further, the secret value estimation methods and devices described herein may be implemented by various means. For example, these techniques may be implemented in hardware, software, or a combination thereof. For a hardware implementation, the processing elements of the estimation device can be implemented for example according to a hardware-only configuration (for example, in one or more FPGA, ASIC or VLSI integrated circuits with the corresponding memory) or according to a configuration using both VLSI and DSP.

Figure 6:
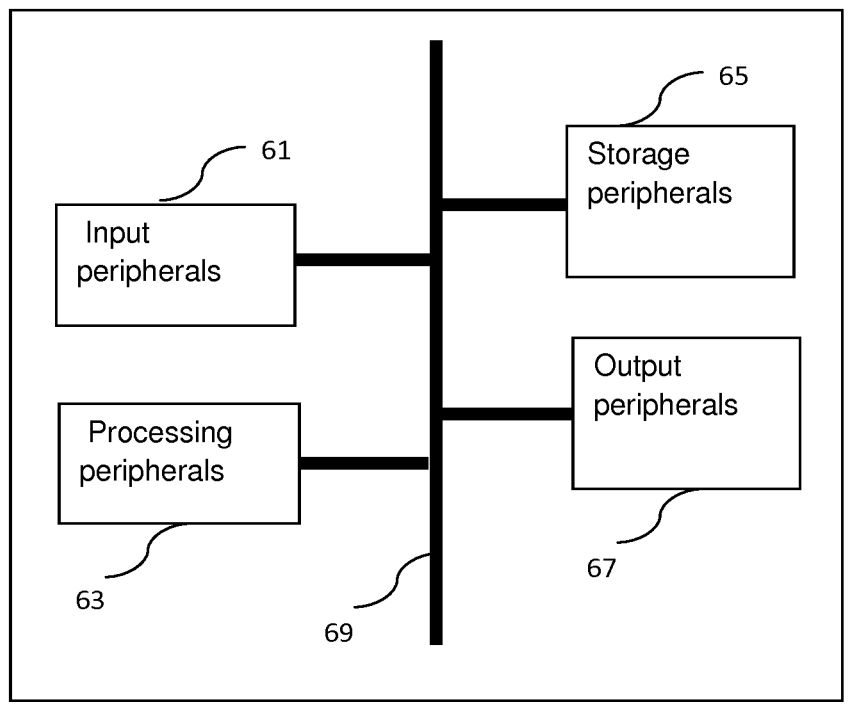
FIG. 6 is an exemplary hardware architecture of the secret key estimation device according to certain embodiments of the invention.

FIG. 6 illustrates exemplary hardware architecture of a secret key estimation device 24 according to certain embodiments of the invention. As depicted, the secret key estimation device 24 may comprise computing, storage and communication devices possibly interacting with one another through a data and address link 69 and including:

Input peripherals 61 for receiving for example input data from the measurement unit 23 or communicating with the system analyzer to control the execution of the various instructions according to the various embodiments of the invention;

Processing peripherals 63 comprising one or more microprocessors (CPU) such as an FPGA or an ASIC configured for example to execute the corresponding instructions to run the methods and algorithms according to the various embodiments of the invention;

Storage peripherals 65 possibly comprising a random access memory (RAM) or a read-only memory to store for example the trace measurements or noise parameters.

Output peripherals 67 comprising communication means such as displays enabling for example man-to-machine interaction between the system analyzer and the secret key estimation device 24 for example in the form of a graphical user interface.

While certain embodiments of the invention have been described in relation to the determination of a secret cryptographic key used for encryption/decryption of data, it should be noted that the invention it not limited to such application. For example, the invention also applies to a cryptographic unit 202 using cryptographic keys in data signature for ensuring the authenticity of a digital document or message used for example in files and software distributions or financial transactions, or in message authentication codes.

Further, the invention is not limited to estimate secret keys used in communication systems. For example, the invention may also apply to cryptographic systems used for example in data processing systems such as smart cards, multimedia players and recorders or mobile storage devices like memory cards and hard discs, with logon access monitored by cryptographic mechanisms. The secret key estimation methods and devices according to various embodiments of the invention more generally apply to a wide range of communication and data processing applications such as in the car industry to ensure anti-theft protection, in service provider systems to secure access cards, in RFID tags and electronic keys, in mobile phone devices to authenticate the control and access to batteries and accessories, in manufacturing of embedded devices and equipments to provide a protection of hardware and software algorithms against cloning and reverse engineering, in banking industry to secure banking accounts and financial transactions, etc.

Further, the various embodiments of the invention are applicable to estimate secret cryptographic values used in any cryptographic implementation in hardware devices such as electronic circuits, any software cryptographic algorithms operating on computer systems or any hybrid systems deploying both hardware and software cryptographic components. Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

The invention claimed is:

1. A device for determining an estimate of at least one secret key used during a number of executions of a cryptographic function used by at least one cryptographic algorithm, said number of executions of said cryptographic function being at least equal to two, wherein the device is configured to:
   determine a plurality of sets of leakage traces from a side-channel information acquired during said number of executions of said cryptographic function, the number of said sets of leakage traces being at least equal to two, each set of leakage traces corresponding to one execution of said cryptographic function and comprising at least one leakage trace, said plurality of sets of leakage traces being represented by a measurements matrix, said measurements matrix comprising column vectors, a column vector comprising leakage traces acquired during one execution of said cryptographic function; and
   determine a statistical distribution of said plurality of sets of leakage traces, said statistical distribution being dependent on a leakage function, said leakage function being represented by a set of unknown real values corresponding to its coordinates in a canonical basis of functions spanning a space vector, said leakage function being the same for all said sets of leakage traces, said device being further configured to determine said statistical distribution of said plurality of sets of leakage traces depending on a noise of a known covariance matrix,
   wherein the device is configured to determine said at least one secret key from said statistical distribution of said plurality of sets of leakage traces represented by said measurements matrix using an estimation algorithm according to a maximization of a performance metric, wherein said estimation algorithm is an iterative algorithm, said iterative algorithm being applied to jointly determine estimates of said unknown real values representing said leakage function and said at least one secret key.

2. The device of claim 1, wherein the number of said plurality of sets of leakage traces is determined from said number of executions of said cryptographic function.

3. The device of claim 1, wherein the number of leakage traces in each set of leakage traces is determined depending on a signal to noise ratio and/or on a target performance metric.

4. The device of claim 1, wherein said performance metric is chosen in a group consisting of a probability of success secret key calculation, a guessing entropy and a success rate of a given order.

5. The device of claim 1, wherein said iterative algorithm is an expectation maximization algorithm, said expectation maximization algorithm operating by iteratively alternating between an expectation step and a maximization step.

6. The device of claim 1, wherein said device is further configured to deliver a performance metric from said estimate of at least one secret key.

7. The device of claim 1, wherein said at least one cryptographic algorithm is a block cipher algorithm, and wherein said cryptographic function is a substitution box and said secret key is a symmetric key.

8. The device of claim 7, wherein said block cipher algorithm is an advanced encryption standard algorithm.

9. The device of claim 5, wherein the expectation step comprises evaluation of an expected value of a logarithmic likelihood function with respect to a conditional distribution of a mask applied to the secret key and the maximization step comprising finding parameters of a vector of unknown values that maximize the expected value of the logarithmic likelihood function evaluated in the expectation step.

10. A method of determining an estimate of at least one secret key used during a number of executions of a cryptographic function used by at least one cryptographic algorithm, said number of executions of said cryptographic function being at least equal to two, wherein said method comprises:
   determining a plurality of sets of leakage traces from a side-channel information acquired during said number of executions of said cryptographic function, each set of leakage traces comprising at least one leakage trace, said plurality of sets of leakage traces being represented by a measurements matrix, said measurements matrix comprising column vectors, a column vector comprising leakage traces acquired during an execution of said cryptographic function; and
   determining a statistical distribution of said plurality of sets of leakage traces, said statistical distribution being dependent on a leakage function, said leakage function being represented by a set of unknown real values corresponding to its coordinates in a canonical basis of functions spanning a space vector, said leakage function being the same for all said sets of leakage traces, the method further comprising determining said statistical distribution of said plurality of sets of leakage traces depending on a noise of a known covariance matrix;
   wherein said method further comprises determining said at least one secret key from said statistical distribution of said plurality of sets of leakage traces represented by said measurements matrix using an estimation algorithm according to a maximization of a performance metric, and
   wherein said estimation algorithm being an iterative algorithm, said iterative algorithm being applied to jointly determine estimates of said unknown real values representing said leakage function and said at least one secret key.

* * * * *